(12) United States Patent
Wu et al.

(10) Patent No.: US 6,356,815 B1
(45) Date of Patent: Mar. 12, 2002

(54) STELLAR ATTITUDE-CONTROL SYSTEMS AND METHODS WITH WEIGHTED MEASUREMENT-NOISE COVARIANCE MATRICES

(75) Inventors: Yeong-Wei A. Wu, Rancho Palos Verdes; Rongsheng Li, Hacienda Heights; Yong Liu, San Marino, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/648,501

(22) Filed: Aug. 25, 2000

(51) Int. Cl.$^7$ .............................................. G01C 21/02
(52) U.S. Cl. .................... 701/13; 701/222; 701/226; 244/164; 244/171
(58) Field of Search ............................ 701/3, 13, 222, 701/226; 244/158 R, 164, 165, 171

(56) References Cited

U.S. PATENT DOCUMENTS

| | | | |
|---|---|---|---|
| 5,546,309 A | * | 8/1996 | Johnson et al. ............. 244/171 |
| 6,047,226 A | * | 4/2000 | Wu et al. ...................... 701/13 |
| 6,108,594 A | * | 8/2000 | Didinsky et al. .............. 701/13 |
| 6,145,790 A | * | 11/2000 | Didinsky et al. ............ 244/164 |
| 6,236,939 B1 | * | 5/2001 | Wu et al. ...................... 701/13 |
| 6,272,432 B1 | * | 8/2001 | Li et al. ...................... 701/222 |

OTHER PUBLICATIONS

Kaplan, Elliot D., *Understanding GPS*, Artech House, Norwood, Massachusetts, 1996, pp. 391–395.

Brookner, Eli, *Tracking and Kalman Filtering Made Easy*, John Wiley and Sons, New York, 1998, pp. 69–74.

\* cited by examiner

Primary Examiner—Gary Chin
(74) Attorney, Agent, or Firm—Gates & Cooper LLP

(57) ABSTRACT

Stellar attitude-control systems and methods are provided with enhanced accuracy because they recognize that important star tracker errors exhibit a boresight symmetry and that these errors can be accurately defined by weighting a measurement-noise covariance matrix $R(t_n)$ with variances that are functions of off-boresight angles of detected stars. A method of the invention derives off-boresight angles $\theta$ from star-tracker signals of detected stars. These off-boresight angles $\theta$ are combined with variance coefficients $\alpha$ to generate off-boresight variances $r_{ob}(t_n)$ that are functions of the off-boresight angles $\theta$ and, in particular, correspond to star tracker color shift errors. A gain matrix $K(t_n)$ is then calculated with a weighted measurement-noise covariance matrix $R(t_n)$ that includes the off-boresight variances $r_{ob}(t_n)$. This gain matrix is used to generate an attitude estimate matrix $X^*(t_n)$ for use in spacecraft attitude control. The variance coefficients $\alpha$ are preferably modified to include star tracker focal length shift errors which are also a function of off-boresight angles $\theta$. It is noted that the variance coefficients $\alpha$ can be reduced by identifying the spectral classes of detected and identified stars. The invention recognizes that Other star tracker errors that are not functions of off-boresight angles are modeled with appropriate constant variances $r_c(t_n)$ that are used to modify the covariance matrix $R(t_n)$.

29 Claims, 7 Drawing Sheets

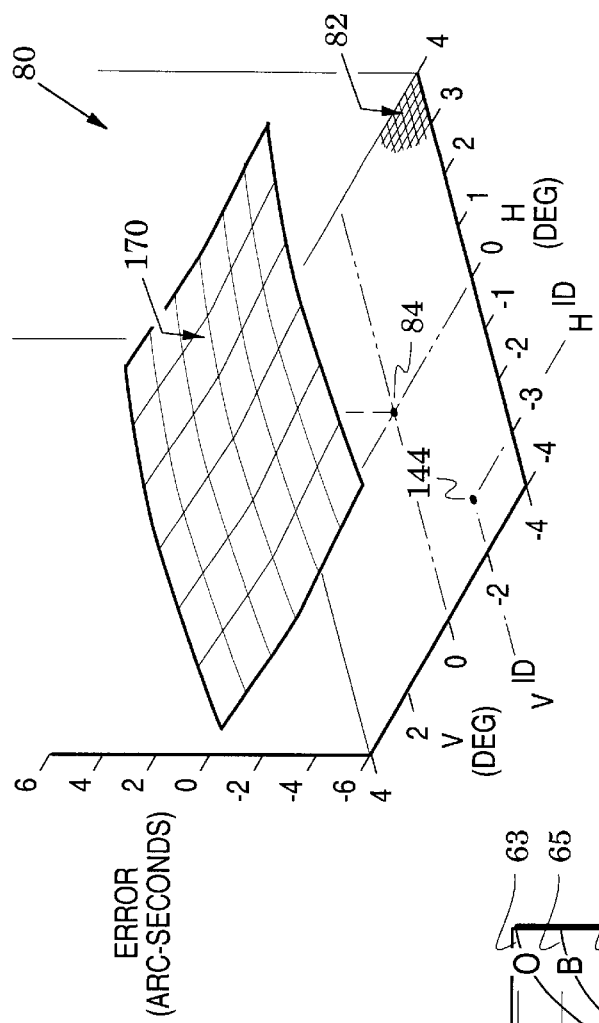
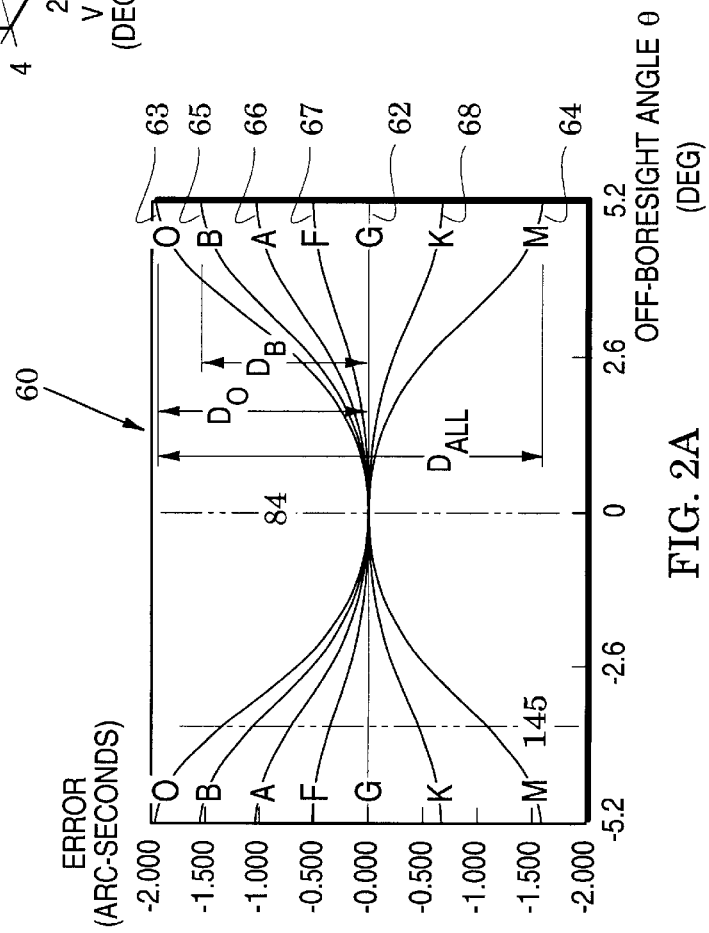
FIG. 2B
FIG. 2A

STELLAR ATTITUDE-CONTROL SYSTEMS AND METHODS WITH WEIGHTED MEASUREMENT-NOISE COVARIANCE MATRICES

BACKGROUND OF THE INVENTION

1. Field of the Invention

The present invention relates generally to spacecraft attitude control systems and methods that employ Kalman filters.

2. Description of the Related Art

Kalman filtering is a statistical technique that combines a knowledge of the statistical nature of system measurement errors with a knowledge of system dynamics, as represented in a state space model, to arrive at an estimate of the state of a system. In general, the system state can include any number of unknowns. Kalman filtering for a spacecraft attitude-control system, for example, is typically configured to have a state matrix that includes attitude and gyroscopic bias but much larger dimensions (e.g., on the order of 60) of state matrices are sometimes used (to enhance generality, the term matrices will be used herein even though some matrices may typically be single column or single row matrices that would otherwise be referred to as vectors).

The Kalman filtering process utilizes a weighting function, called the Kalman gain, which is optimized to produce a minimum estimate variance (i.e., the estimate's accuracy is maximized). In particular, a Kalman filter combines a current measurement $y(t_n)$ of a parameter x (e.g., an attitude) at a time $t_n$ with measurement and state predictions $y^*(t_n^-)$ and $x^*(t_n^-)$ of the parameter x that are based on past measurements (and thus apply to a time $t_n^-$ just before $t_n$) to provide a filtered estimate $x^*(t_n^+)$ of x at a time $t_n^+$ just after the time $t_n$. As indicated by the subscript n, the filter successively and recursively combines the measurements and predictions to obtain an estimate with a minimum variance (i.e., maximum accuracy).

This process is succinctly summarized in an estimate update equation $$x^*(t_n^+) = x^*(t_n^-) + k(t_n)\{y(t_n) - y^*(t_n^-)\}, \quad (1)$$

in which the state prediction $x^*(t_n^-)$ just before the measurement $y(t_n)$ is updated by a portion $k(t_n)$ of a residue which is the difference $\{y(t_n) - y^*(t_n^-)\}$ between the measurement $y(t_n)$ and the measurement prediction $y^*(t_n^-)$ to form an estimate $x^*(t_n^+)$ for a time $t_n^+$ just after the measurement $y(t_n)$ was made. The portion $k(t_n)$ is the Kalman gain which is calculated as $$k(t_n) = \frac{\sigma_x*^2(t_n^-)}{\sigma_x*^2(t_n^-) - \sigma_m^2} \quad (2)$$

in which $\sigma_x*^2(t_n^-)$ is the estimate variance (i.e., uncertainty of the estimate) just before the measurement $y(t_n)$ and $\sigma_m^2$ is the measurement variance (i.e., uncertainty of the measurement). The measurement variance $\sigma_m^2$ is a function of the system under consideration and, more particularly, of the system's measurement hardware (e.g., manufacturers of spacecraft star trackers and gyros typically specify attitude and attitude rate measurement errors).

In contrast, the estimate variance is reduced as the Kalman process continues. In the beginning of the process, the estimate variance is generally much greater than the measurement variance so that the gain $k(t_n)$ of equation (2) approaches one. As the process continues, the estimate variance is reduced below the measurement variance so that the gain $k(t_n)$ declines to a value much less than one. It is apparent from equation (1), therefore, that a large portion of the residue $\{y(t_n) - y^*(t_n^-)\}$ is initially used to update the state prediction $x^*(t_n^-)$ into the updated estimate $x^*(t_n^+)$ but this portion decreases as the process continues (i.e., the weighting given to new measurements is successively reduced). In particular, the estimate variance is reduced (i.e., updated) at each measurement $y(t_n)$ in accordance with $$\sigma_{x*}2(t_n^+) = (1 - k(t_n))\sigma_{x*}2(t_n^-) \quad (3)$$

The updated variance $\sigma_{x*}2(t_n^+)$ is time delayed so that it becomes the estimate variance $\sigma_{x*}2(t_n^-)$ that is used in equation (2) for calculating the next gain $k(t_n)$. It has been shown that the estimate variance can be expressed as $\sigma_m^2/n$ and thus, it asymptotically approaches zero as more data (i.e., measurements) is obtained.

FIG. 1 illustrates a block diagram 20 of typical Kalman processes that are expressed in a more general matrix form. The Kalman filter 20 comprises an estimator 22 and a gain calculator 24 that supplies a Kalman gain matrix $K(t_n)$ to a multiplier 26 of the estimator. To facilitate a description of the filter 20, an investigation of the gain calculator 24 is preceded by the following description of the estimator.

The estimator 22 receives a measurement matrix $Y(t_n)$ at an input port 28 and provides an estimate matrix $X^*(t_n^+)$ for a time just after the measurement to an output port 30. From this estimate matrix, a state prediction matrix $X^*(t_n^-)$ is formed for a time just before the next measurement and this state prediction is provided to a summer 32. Because the state of the system typically varies dynamically between measurements, the estimate matrix $X^*(t_n^+)$ that corresponds to a time just after the last measurement must be extrapolated over time to form the state prediction matrix $X^*(t_n^-)$.

As shown in FIG. 1, this extrapolation is accomplished by passing the estimate matrix $X^*(t_n^+)$ through a delay 34 (to cause it to be time-incident with the next measurement matrix $Y(t_n)$) and multiplying it by a state transition matrix 36 which contains extrapolation information in the form of a state transition matrix $\Phi(t_n, t_{n-1})$. For example, if one component of the estimate matrix $X^*(t_n^+)$ is a position $x(t_n^+)$, the state transition matrix $\Phi(t_n, t_{n-1})$ might be configured to extrapolate the position with a term of $Tv(t_n^+)$ wherein T is the time between measurements and $v(t_n^+)$ is the last estimate of velocity.

The state prediction matrix $X^*(t_n^-)$ is also multiplied by a measurement matrix 38 to form a measurement prediction $Y^*(t_n^-)$ which is provided to a differencer 40 where it is differenced with the measurement matrix $Y(t_n)$. The measurement matrix $H(t_n)$ conditions the state prediction matrix $X^*(t_n^-)$ so that its elements correspond to those of the measurement matrix $Y(t_n)$ and can be properly differenced with it.

As a first conditioning example, the measurement may be expressed in one coordinate system (e.g., rectangular) and the estimates tracked in a different coordinate system (e.g., spherical). In this example, the measurement matrix $H(t_n)$ would be configured to convert the estimates to the coordinate system of the measurements. In a second conditioning example, attitude and gyroscopic bias might be part of the prediction matrix $X^*(t_n^-)$ but only attitude might be present in the measurement matrix $Y(t_n)$ so that the measurement matrix $H(t_n)$ would be configured to make the necessary conversion.

The differencer 40, therefore, generates a residue $Y(t_n) - H(t_n)Y^*(t_n^-)$ which is then multiplied in the multiplier 26 to form a correction $K(t_n)\{Y(t_n) - H(t_n)Y^*(t_n^-)\}$ that will be used to update the estimate matrix. The updating is performed in the summer 32 where the correction is summed with the state prediction matrix $X^*(t_n)$ to generate the updated estimate matrix $$X^*(t_n^+) = X^*(t_n^-) + K(t_n)\{Y(t_n) - H(t_n)Y^*(t_n^-)\} \quad (4)$$

at the output port 30.

Attention is now directed to the Kalman gain calculator 24 which performs similar updating and extrapolation processes for the Kalman gain matrix $K(t_n)$. In the matrix notation of FIG. 1, the estimate variance $\sigma_{x^*}2(t_n^-)$ and the measurement variance $\sigma_m^2$ are respectively replaced by an estimate covariance matrix $P(t_n)$ and a measurement-noise covariance matrix $R(t_n)$. These matrices may be respectively considered to be measures of prediction error (i.e., error in the state prediction matrix $X^*(t_n^-)$) and of measurement error (i.e., error in the estimate matrix $Y(t_n)$).

When these matrix replacements are made in equation (2), the calculation of Kalman gain becomes $$K(t_n) = P(t_n^-)H^T(t_n)\{H(t_n)P(t_n^-)H^T(t_n) + R(t_n)\}^- \quad (5)$$

in which the the estimate covariance matrix $P(t_n)$ is appropriately modified by the measurement matrix $H(t_n)$ and its transform $H^T(t_n)$. In the gain calculator 24 of FIG. 1, the process recited in equation (5) is performed by the gain calculation block 42.

The estimate covariance matrix $P(t_n)$ is updated between measurements in an update block 44 wherein the estimate variance $\sigma_{x^*}2(t_n^-)$ of equation (3) has been replaced by the estimate covariance matrix $P(t_n)$ as modified by the measurement matrix $H(t_n)$. Accordingly, the updated estimate covariance matrix $P(t_n)$ is processed as $$P(t_n) = \{I - K(t_n)H(t_n)\} P(t_n^-). \quad (6)$$

The updated estimate covariance matrix is passed through delay 45 to cause it to be time-incident with the next measurement matrix $Y(t_n)$. Because of the dynamic nature of the system's state, the updated estimate covariance matrix $P(t_n)$ must also be extrapolated over time to form an estimate covariance matrix $P(t_n^-)$ for the time just before the next measurement. As shown in extrapolation block 46, this extrapolation is processed as $$P(t_n^-) = \Phi(t_n, t_{n-1})P(t_n^+)\Phi^T(t_n, t_{n-1}) + Q(t_{n-1}) \quad (7)$$

and is effected with the state transition matrix $\Phi(t_n, t_{n-1})$ and its transform. In addition, plant or process noise, which includes modeling errors as well as actual noise and system disturbances, is summarized in a process-noise covariance matrix $Q(t_{n-1})$.

As detailed above, the gain calculator 24 updates the estimate covariance matrix $P(t_n)$ in update block 44, delays it in delay 45 and extrapolates it in extrapolation block 46 to generate the covariance matrix $P(t_n^-)$ The updated, delayed and extrapolated estimate covariance matrix in extrapolation block 46 is then combined with the measurement-noise covariance matrix $R(t_n)$ in the gain calculation block 42 to calculate a gain $K(t_n)$ which is provided to the estimator 22 for processing the current measurement $Y(t_n)$ at the input port 28 into an updated estimate $X^*(t_n^+)$ at the output port 30.

Although the Kalman filter 20 of FIG. 1 is configured to combine parameter measurements and parameter predictions to obtain parameter estimates with minimum variances, its operational performance relies upon the accuracy of information that is provided to it (e.g., by the state transition matrix $\Phi(t_n, t_{n-1})$, the measurement matrix $H(t_n)$ and the measurement-noise covariance matrix $R(t_n)$).

In particular, the measurement-noise covariance matrix $R(t_n)$ will degrade performance of the Kalman filter of FIG. 1 if it misstates or omits measurement errors because this corrupts the gain $K(t_n)$ and, thereby, the calculated estimate $X^*(t_n^+)$. It has been found especially difficult, for example, to accurately model star tracker measurement errors in spacecraft attitude control systems.

SUMMARY OF THE INVENTION

The present invention is directed to stellar attitude-control systems and methods whose accuracy is enhanced because they accurately define star tracker measurement variances in Kalman filter gain calculations. These goals are realized with the recognition that important star tracker errors exhibit a boresight symmetry and that these errors can be accurately defined by weighting a measurement-noise covariance matrix $R(t_n)$ with variances that are functions of off-boresight angles of detected stars.

A control method embodiment of the invention derives off-boresight angles $\theta$ from star-tracker signals of detected stars. These off-boresight angles $\theta$ are combined with variance coefficients $\alpha$ to generate off-boresight variances $r_{ob}(t_n)$ that are functions of the off-boresight angles $\theta$ and, in particular, correspond to star tracker color shift errors.

A gain matrix $K(t_n)$ is then calculated with a weighted measurement-noise covariance matrix $R(t_n)$ that includes the off-boresight variances $r_{ob}(t_n)$. This gain matrix is used to generate an attitude estimate matrix $X^*(t_n)$ for use in spacecraft attitude control.

The variance coefficients $\alpha$ are preferably modified to include star tracker focal length shift errors which are also a function of off-boresight angles $\theta$. It is noted that the variance coefficients a can be reduced by identifying the spectral classes of detected and identified stars.

The invention recognizes that other star tracker errors are not functions of off-boresight angles and therefore modifies the covariance matrix $R(t_n)$ with appropriate constant variances $r_c(t_n)$.

Attitude-control system embodiments are also described for realizing these methods.

The novel features of the invention are set forth with particularity in the appended claims. The invention will be best understood from the following description when read in conjunction with the accompanying drawings.

BRIEF DESCRIPTION OF THE DRAWINGS

FIG. 2A is a graph of star tracker star color-shift errors as a function of off-boresight angles $\theta$;

FIG. 2B is a graph of calibration residuals due to star tracker focal length shift errors;

DETAILED DESCRIPTION OF THE PREFERRED EMBODIMENTS

Figure 1:
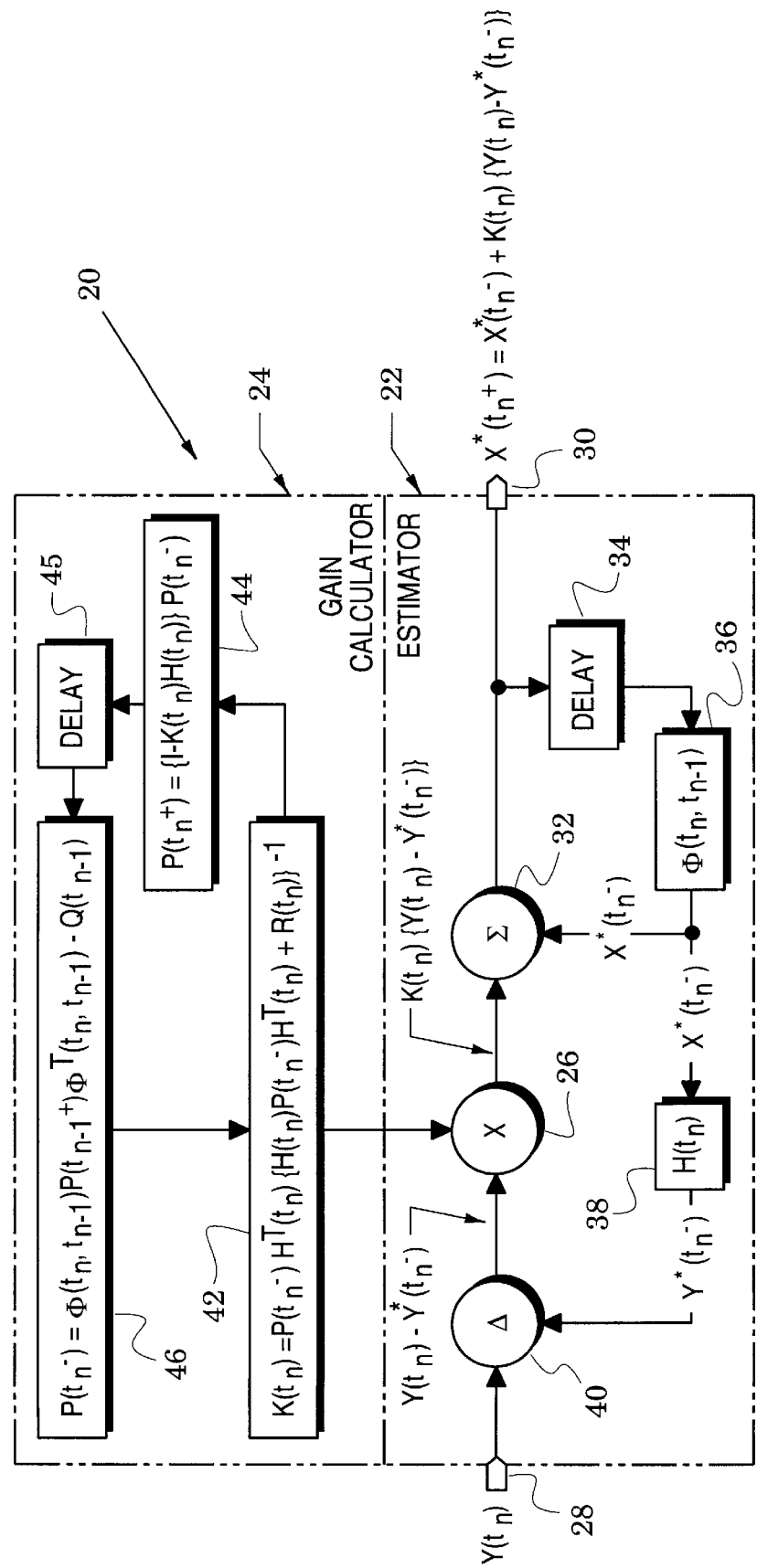
FIG. 1 is a block diagram that illustrates Kalman filtering processes.

The present invention is directed to accurate attitude-control systems and methods for spacecraft. In particular, it is directed to the determination of measurement-noise covariance matrices $R(t_n)$ whose correlation to star tracker errors is enhanced over those of conventional attitude-control systems and methods. Accordingly, such matrices enhance accuracy in the realization of attitude estimate matrices $X^*(t_n^+)$ for times $t_n^+$ after respective attitude measurements at successive times $t_n$. These enhanced attitude estimates facilitate more accurate control of spacecraft attitudes.

The invention recognizes that certain star tracker errors exhibit a boresight symmetry and further recognizes that these errors can be accurately accounted for with star tracker variances that are functions of off-boresight angles of stars that are detected by the star tracker For example, FIGS. 2A and 2B illustrate graphs 60 and 80 that respectively show star color shift errors and focal length errors of exemplary star trackers.

Star trackers are generally formed with an array of charge coupled devices (CCDs) that each generate electrical signals in response to received photons that are focused onto the array by an optical system of the star tracker. The CCD array typically generates star-position signals that can be located relative to two orthogonal axes of the array. FIG. 2B, for example, shows an exemplary CCD array 82 wherein off-boresight angles θ can be defined relative to a star tracker boresight 84 at the origin of orthogonal CCD horizontal and vertical axes H and V.

FIG. 2A illustrates color shift errors along a plane through the boresight 84 of FIG. 2B. In contrast to FIG. 2B, the exemplary plane of FIG. 2A portrays errors along any measurement plane through the boresight 84. Because of chromatic aberration in the star tracker's optical system, light from different spectral classes of stars will be focused with different spot shapes. Accordingly, the focused light on the array has different centroids and different apparent positions for stars of different spectral classes.

Plots 62–68 of FIG. 2A indicate the resultant color shift errors for these different spectral classes of stars. The graph 60 corresponds to an exemplary star tracker which has a field-of-view (FOV) of 5.2° and has been calibrated for G-class stars and, accordingly, plots of other star classes diverge from the plot 62 that corresponds to G-class stars. Plots 63 and 64 respectively correspond to O-class and M-class stars. As shown, plot 63 diverges in one direction as a function of off-boresight angle θ and plot 64 diverges in an opposite direction as a function of the off-boresight angle θ. Plots 65, 66, 67 and 68 illustrate intermediate divergences and respectively correspond to B-class, A-class, F-class and K-class stars. Because of the illustrated divergences, it is apparent that the variance of the star tracker's signals is an increasing function of the off-boresight angles θ of detected stars. It is further apparent that the variance can be reduced if the spectral class of detected stars is known.

The invention recognizes that the color shift errors of FIG. 2A exhibit symmetry with respect to off-boresight angles θ and, with this recognition, it provides a measurement-noise covariance matrix $R(t_n)$ whose correlation to star tracker errors is enhanced over those of conventional spacecraft attitude-control systems and methods. This enhancement facilitates the generation of a spacecraft attitude estimate that has an enhanced accuracy which, in turn, facilitates more accurate control of spacecraft attitude.

In particular, the invention provides a method of generating an enhanced attitude estimate matrix $X^*(t_n^+)$ for times $t_n^+$ after respective attitude measurements at successive times $t_n$ for use in attitude control of a spacecraft. The method is exemplified by the process steps 92–96 of the flow chart 90 of FIG. 3A. Because this method is best understood in the context of a system that can use it to control spacecraft attitude, an investigation of the method is preceded by the following description of the attitude determination system 100 of FIG. 5.

This system comprises an attitude determination system 102, a torque generation system 104 and a spacecraft attitude controller 106 that provides attitude control signals 107 to the torque generation system 104 in response to the attitude difference between a commanded attitude 108 and an attitude estimate from the attitude determination system 102.

The attitude determination system 102 includes a Kalman filter 110, attitude sensors in the form of star trackers 112 and attitude rate sensors in the form of gyroscopes (gyros) 114. Attitude data signals from the star trackers 112 are processed in a star data processor 113 to form attitude measurements that are typically arranged along orthogonal axes (e.g., the H and V axes of FIG. 2B) to form an attitude measurement matrix $Y(t_n)$ whose elements represent attitude measurements at successive times $t_n$. The attitude measurement matrix $Y(t_n)$ is provided to an input port 118 of the Kalman filter 110.

Attitude rate data signals from the gyros 114 are processed in a gyro data processor 115 to form attitude rate measurements $Y_r(t_n)$ that are provided to an attitude and gyro bias propagator 120 of the Kalman filter 110. The attitude rate measurements are processed in a state transition matrix $\Phi(t_n, t_{n-1})$ in the attitude and gyro bias propagator 120. The propagator delays the attitude estimate at an output port 122 of the Kalman filter and processes the delayed signal with the state transition matrix $\Phi(t_n, t_{n-1})$ to form an attitude prediction matrix $X^*(t_n^-)$ which is delivered to a summer 124 and a star ID and residual computer 126.

The star ID and residual computer 126 receives the attitude measurement matrix $Y(t_n)$, the attitude prediction matrix $X^*(t_n^-)$ and relative star positions from a star catalog 128. With these inputs and an internally-formed measurement matrix $H(t_n)$ (e.g., the matrix 38 of FIG. 1), the computer 124 processes the attitude prediction matrix $X^*(t_n^-)$ into a measurement prediction matrix $Y^*(t_n^-)$ and subtracts that from the attitude measurement matrix $Y(t_n)$ to realize a residue $Y(t_n) - Y^*(t_n^-)$.

In a multiplier 129, the residue is then multiplied by a gain matrix $K(t_n)$ that is delivered to the multiplier by a Kalman gain calculator 130. The resultant correction $K(t_n)\{Y(t_n) - Y^*(t_n^-)\}$ is summed in the summer 124 with the attitude prediction matrix $X^*(t_n^-)$ to generate the estimate matrix $X^*(t_n^+)$ at the output port 122 of the attitude determination system 102. The state transition matrix $\Phi(t_n, 'n-1)$ in the attitude and gyro bias propagator 120 is preferably configured so that the estimate matrix $X^*(t_n^+)$ includes estimates of gyro biases along with estimates of attitude.

As previously described, the estimate matrix $X^*(t_n^+)$ is received by an attitude controller 106 which provides attitude control signals 107 to the torque generation system 104 in response to the attitude difference between the attitude estimate and a commanded attitude 108. The torque generation system 104 has torque generators (e.g., thrusters 136, momentum wheels 137 and/or magnetic torquers 138) coupled to the spacecraft so that they change its attitude in response to the attitude control signals 107. The resultant attitude change of the spacecraft effectively forms a feedback path 139 back to the gyros 114 and star trackers 112 which sense this attitude change.

The structure of the Kalman filter 110 is functionally organized to perform the processes of FIG. 1. Accordingly, the star ID and residual computer 126 with its star catalog 128, the multiplier 124, the summer 129 and the attitude and gyro bias integrator 120 form an estimator 140 that performs the functions of the estimator 22 of FIG. 1 and the Kalman gain calculator 130 of FIG. 5 performs the functions of the gain calculator 24 of FIG. 1.

Figure 3A:
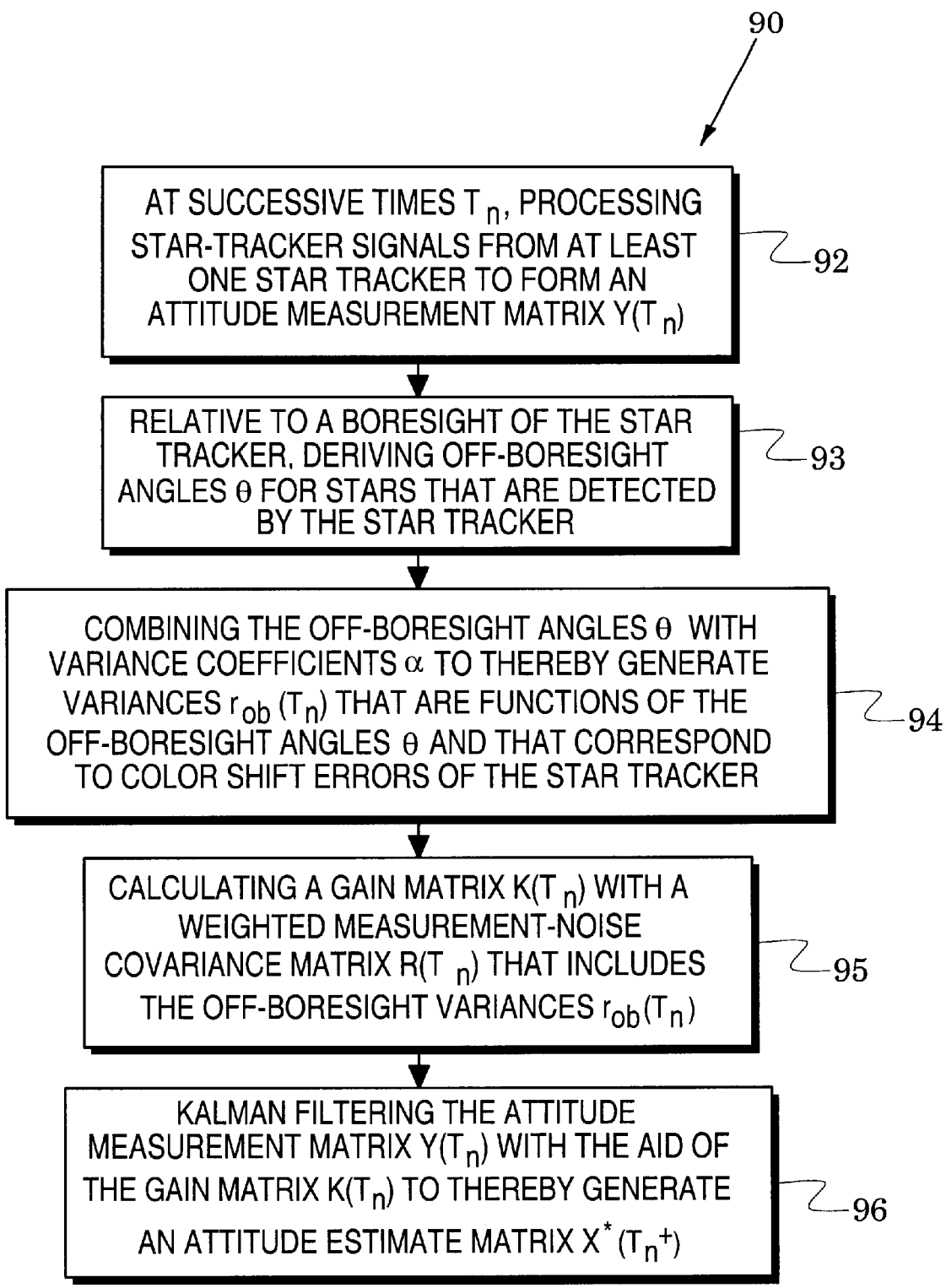
FIGS. 3A and 3B illustrate method embodiments of the present invention for generating an attitude estimate matrix $X^*(t_n^+)$.
Figure 5:
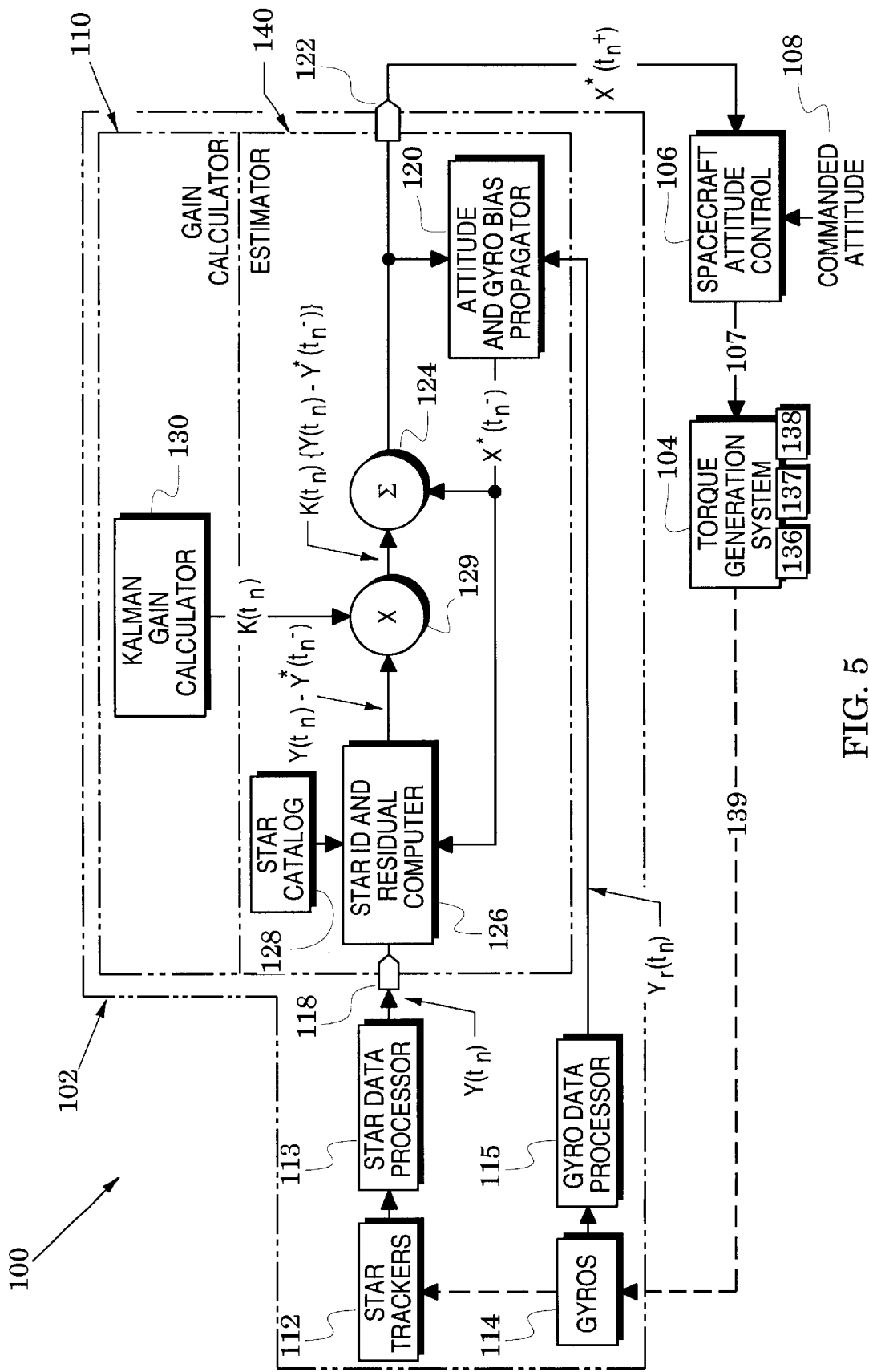
FIG. 5 is a block diagram of a spacecraft attitude-control system embodiment for practicing the methods of FIGS. 3A and 3B.

Having investigated the attitude control system 100 of FIG. 5, attention is now returned to the flow chart 90 of FIG. 3A. A first process step 92 of this chart processes (e.g., with star data processor 113 of FIG. 5), at successive times $t_n$, star-tracker signals from at least one star tracker (e.g., star tracker 112 of FIG. 5) to form an attitude measurement matrix $Y(t_n)$.

Relative to a boresight of the star tracker, process step 93 derives off-boresight angles θ from the star-tracker signals for stars that are detected by the star tracker. FIG. 2B illustrates an exemplary focused spot 144 formed on the CCD array 82 by stellar light that has been focused through the star tracker's optical system. Because the spot represents an identified star with coordinates $H^{ID}$ and $V^{ID}$, the off-boresight angle θ is the square root of $(H^{ID})^2+(V^{ID})^2$. In FIG. 2B, these exemplary coordinates are respectively −3° and −2° so that the off-boresight angle θ 3.6°.

Process step 94 combines the off-boresight angles θ with variance coefficients α to thereby generate off-boresight variances $r_{ob}(t_n)$ that are functions of the off-boresight angles θ and correspond to color shift errors of the star tracker. It is apparent from the diverging error plots (e.g., plots 63 and 64) of FIG. 2A, that the variance increases with increased off-boresight angle θ and that a variance coefficient α can be selected to closely approximate this increase.

Figure 4:
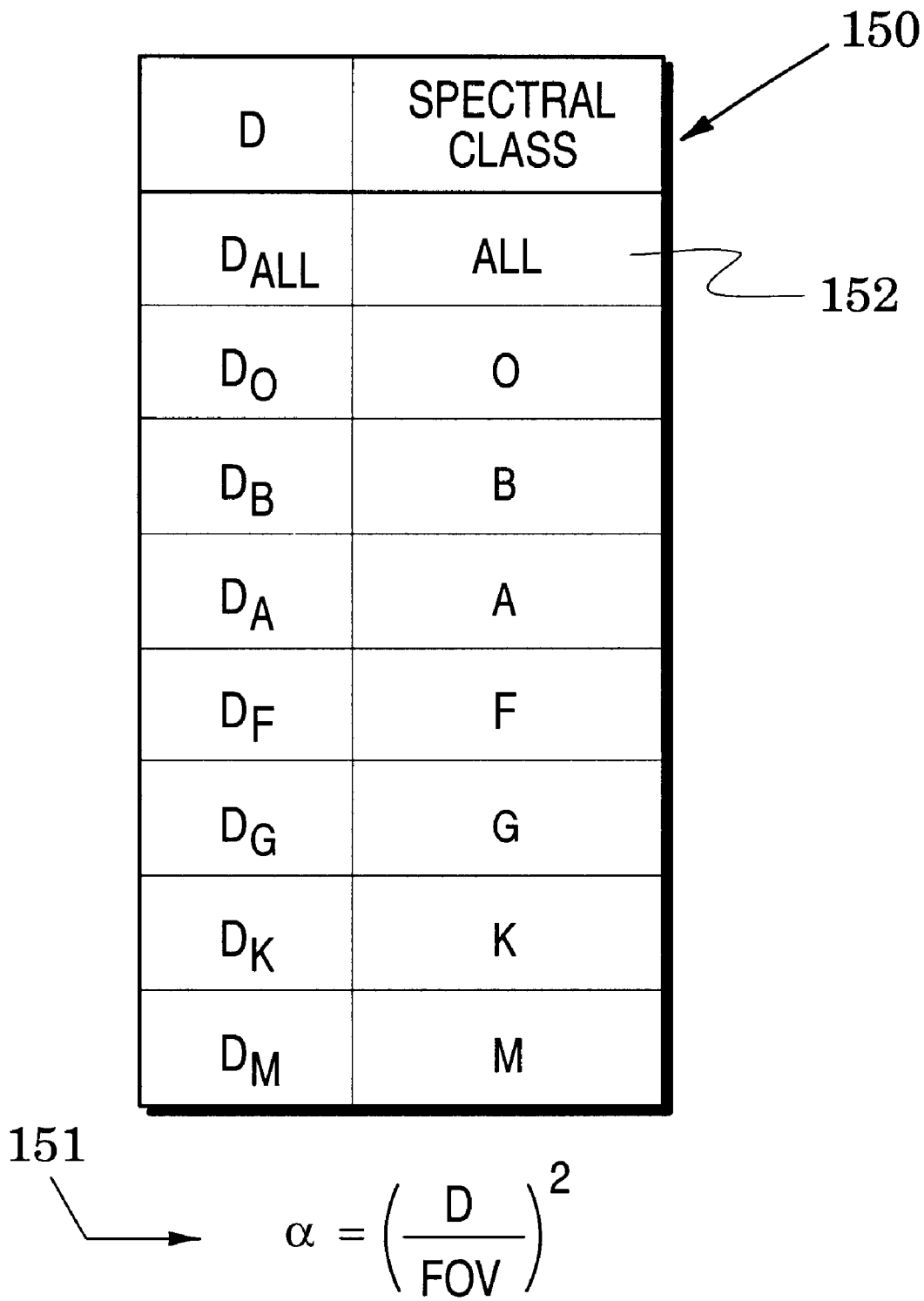
FIG. 4 is a table that can be used to form exemplary variance coefficients a from the graph of FIG. 2A.

For example, FIG. 4 shows a relationship 151 in which the variance coefficient α is set equal to the square of a ratio of a divergence D to the star tracker's field-of-view FOV (for the exemplary star tracker of FIG. 2A, the FOV is 5.2°). FIG. 4 also shows a table 150 that provides an appropriate divergence D for relationship 151 for various spectral classes of stars. The first entry 152 of table 150 considers the case where a star's spectral class is not identified (i.e., the star could be any of the spectral classes O, B, A, F, G, K and M of FIG. 2A). In this case, the spectral class is listed as "ALL" and the appropriate divergence is the divergence $D_{ALL}$ that is shown in FIG. 2A.

This divergence $D_{ALL}$ is thus entered in the relationship 151 to generate an appropriate variance coefficient α. Because it is desired to generate an off-boresight variance, the off-boresight angle θ is preferably also squared and multiplied by the variance coefficient α to form an off-boresight variance $r_{ob}(t_n)$ of $$r_{ob}(t_n)=\alpha\{(H^{ID})^2+(V^{ID})^2\}. \quad (8)$$

With the exemplary off-boresight variance of equation (8), the flow chart 90 of FIG. 3 proceeds to process steps 95 and 96. Step 95 calculates a gain matrix $K(t_n)$ with a weighted measurement-noise covariance matrix $R(t_n)$ that includes the off-boresight variances $r_{ob}(t_n)$. This step is performed in the gain calculator 130 of FIG. 5 by executing the steps 44, 45, 46 and 42 of FIG. 1. Process step 96 then Kalman filters the attitude measurement matrix $Y(t_n)$ with the aid of the gain matrix $K(t_n)$ to thereby generate the attitude estimate matrix $X^*(t_n^+)$. That is, process step 96 performs the processes of the estimator 22 of FIG. 1 to generate the attitude estimate matrix $X^*(t_n^+)$ In summary, the method recited in FIG. 3A receives an attitude measurement matrix $Y(t_n)$ and generates an attitude estimate matrix $X^*(t_n^+)$ with the use of a weighted measurement-noise covariance matrix $R(t_n)$ that includes the off-boresight variances $r_{ob}(t_n)$. Because the off-boresight variances $r_{ob}(t_n)$ of the matrix $R(t_n)$ are appropriately weighted to track color shift errors that increase with increased off-boresight angle θ, they more accurately represent the actual variances of conventional star trackers. A more accurate gain matrix $K(t_n)$ is thereby calculated and, hence, a more accurate attitude estimate matrix $X^*(t_n^+)$ is generated.

Figure 3B:
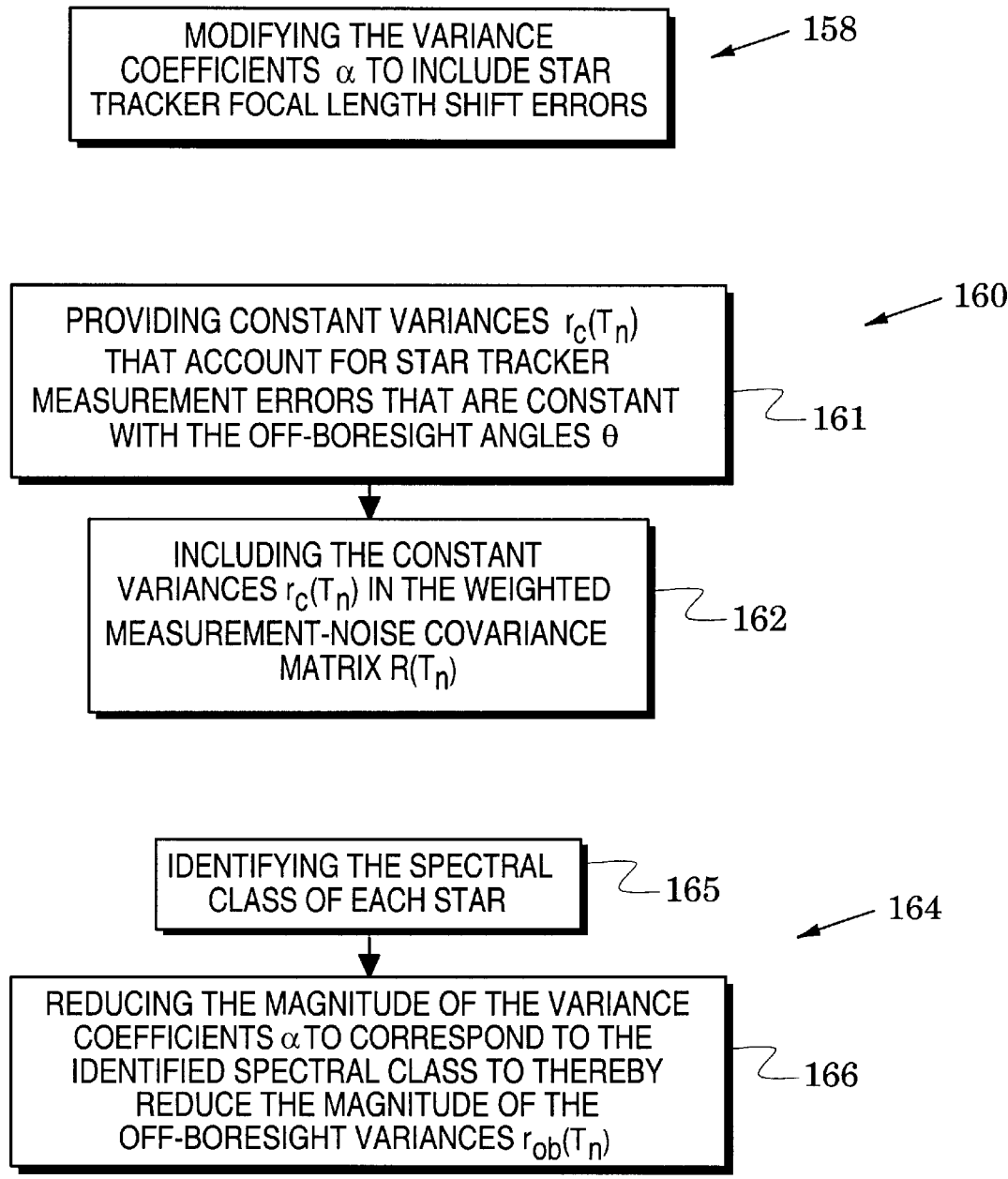

The basic processes of FIG. 3A may be expanded by the processes recited in FIG. 3B. For example, process step 158 recognizes that another star tracker variance is also a function of the off-boresight angles θ of detected stars. In particular, FIG. 2B defines a sheet 170 that defines angle errors of the CCD array 82 that are caused by temperature-induced focal length shifts in the array's focusing system. These focal length shifts cause the focused-light centroids (e.g., the centroid of the spot 144) to have variances that are functions of the off-boresight angles θ.

For example, the sheet 170 indicates an off-boresight angle dependence wherein the H axis dependence is different from the Y axis dependence. This off-boresight angle functionality can be realized by modifying equation (8) with horizontal and vertical variance coefficients $\alpha_h$ and $\alpha_v$ to thereby define horizontal and vertical off-boresight variances of $$r_{ob_h}(t_n)=\alpha_h\{(H^{ID})^2+(V^{ID})^2\}$$

and $$r_{ob_v}(t_n)=\alpha_v\{(H^{ID})^2+(V^{ID})^2\}. \quad (9)$$

The method 160 of FIG. 3B recognizes that there are conventional star tracker errors (e.g., charge transfer efficiency errors and CCD array deformation) that are constant with respect to the off-boresight angles θ. Accordingly, process step 161 provides constant variances $r_{c_h}(t_n)$ and $r_{c_v}(t_n)$ that account for the constant star tracker measurement variances. Process step 162 then includes these constant variances with those of equation (9) to form horizontal and vertical variances $$r_h(t_n)=r_{c_h}(t_n)+\alpha_h\{(H^{ID})^2+(V^{ID})^2\}$$

and $$r_v(t_n)=r_{c_v}(t_n)+\alpha_v\{(H^{ID})^2+(V^{ID})^2\} \quad (10)$$

which can be used to form a weighted measurement-noise covariance matrix $R(t_n)$ of $$R(t_n) = \begin{bmatrix} r_h & 0 \\ 0 & r_v \end{bmatrix}. \quad (11)$$

The method 164 of FIG. 3B reduces the magnitude of the variance coefficients α. In a first process step 165, the spectral class of each detected star is identified (e.g., with the star catalog 128 of FIG. 5). Because the spectral class is now known, the variance no longer must account for the total divergence $D_{ALL}$ that is shown in FIGS. 2A and 4 but with a lesser variance that corresponds to a divergence of each spectral class.

For example, FIG. 2A shows divergences $D_O$ and $D_B$ for spectral classes O and B respectively, and the table 150 of FIG. 4 lists corresponding divergences and spectral classes. If a star has been identified as being of either of these spectral classes, the appropriate one of these divergences would be entered in the relationship 151 of FIG. 4 and the reduced variance coefficient α used in equations (8), (9) and (10) above. For clarity of illustration, the divergences for other spectral classes are not shown in FIG. 2A but they follow the pattern shown for classes O and B. It is noted that the divergence for spectral class G is zero because the exemplary star tracker was calibrated for that class. In summary, process step 166 reduces the magnitude of the variances to correspond to the identified spectral class and this realizes an appropriate reduction in the magnitude of the off-boresight variances $r_{ob}(t_n)$ of equations (9).

It is noted that the variance coefficients α that are generated by the relationship 151 of FIG. 4 represent slopes that approximate the divergences of FIG. 2A. A more exact realization of process step 94 of FIG. 3A would store divergences for a plurality of off-boresight angles for each spectral class. This process of the invention generates variance coefficients α that have an enhanced accuracy but requires greater processing efforts.

Figure 6:
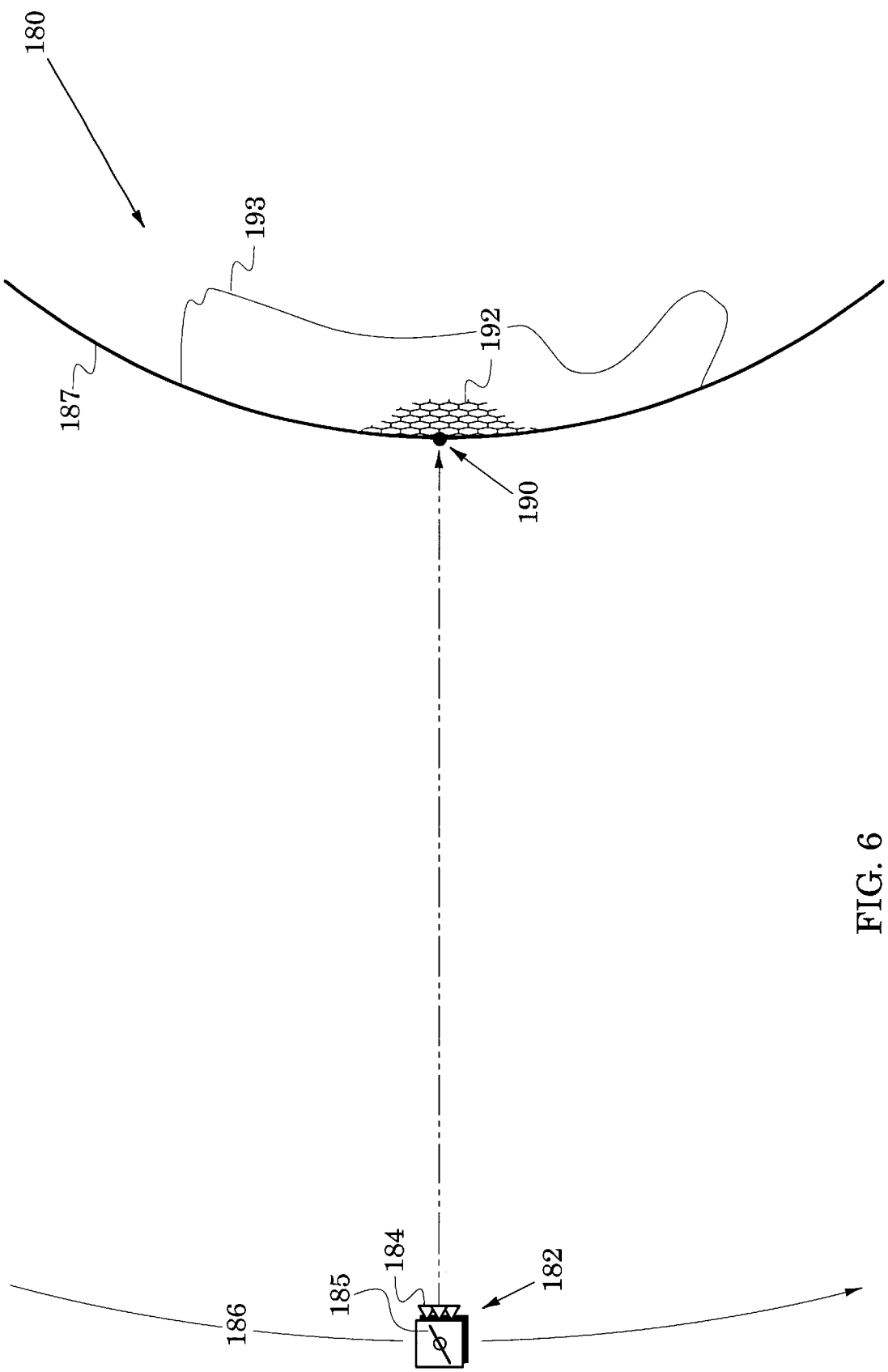
FIG. 6 is a diagram of a spacecraft that includes the stellar inertial attitude determination system of FIG. 5.

The diagram 180 of FIG. 6 illustrates an exemplary satellite 182 having antennas 184 and solar panels 185 and traveling in an orbital path 186 about the earth 187. Incorporation of the teachings of the invention (e.g., the attitude determination system 100 of FIG. 5) into the satellite 182 enhances the accuracy of its attitude control. For example, the satellite's attitude may be more accurately controlled to direct its antennas 184 at various targets (e.g., a sub-orbital point 190 or respective communication cells 192 in a terrestrial area 193) with greater precision.

In an exemplary realization of the attitude determination system 100 of FIG. 5, the star data processor 113 provides a 2×1 attitude measurement matrix $Y(t_n)$ with entries of horizontal and vertical attitudes to the input port 118 of the Kalman filter 110. In response, the Kalman filter generates a 6×1 attitude estimate matrix $X^*(t_n^+)$ at the output port 122 that contains three attitude estimates and three gyro bias estimates.

This output is multiplied by a 6×6 state transition matrix $\Phi(t_n, t_{n-1})$ in the attitude and gyro bias propagator 120 to realize a 6×1 state prediction matrix $X^*(t_n^-)$ that includes predicted attitudes and gyro biases. This latter matrix is multiplied within the star ID and residual computer 126 by a 2×6 measurement matrix $H(t_n)$ to realize a 2×1 measurement prediction matrix $Y^*(t_n)$ that is subtracted from the 2×1 attitude measurement matrix $Y(t_n)$ to realize a 2×1 residue. The Kalman gain calculator 130 provides a 6×2 gain matrix $K(t_n)$ which multiplies (in the multiplier 124) the 2×1 residue to form a 6×1 correction matrix. This latter matrix is added in the adder 129 to the 6×1 state prediction matrix $X^*(t_n^-)$ to generate the 6×1 attitude estimate matrix $X^*(t_n^+)$.

The teachings of the invention may be practiced with various conventional star trackers for which the necessary performance data (e.g., performance data shown in FIGS. 2A and 2B) can be obtained. With an exemplary set of star trackers, the variance coefficients $\alpha_h$ and $\alpha_v$ of equations (5) have been set to $6.02815574\ e^{-08}$ and the constant variances $r_{c_h}(t_n)$ and $r_{c_v}(t_n)$ have been set at $5.875776\ e^{-10}$ radians².

The star trackers 112 and gyros 114 of the attitude determination system 102 of FIG. 5 are structures that are generally manufactured and supplied for integration into attitude control systems. Although the remaining elements of the attitude determination system 102 may be realized with discrete circuits (e.g., digital circuits), they are preferably realized with a data processor that is programmed to execute the described functions (e.g., those of FIGS. 1, 3A and 3B).

As previously noted, the term matrices has been used herein even though some of the matrices that are referred to might typically be single column or single row matrices that would otherwise be referred to as vectors.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of generating an attitude estimate matrix $X^*(t_n^+)$ for times $t_n^+$ after respective attitude measurements at successive times $t_n$ for use in attitude control of a spacecraft, the method comprising the steps of:

at successive times $t_n$, processing star-tracker signals from at least one star tracker to form an attitude measurement matrix $Y(t_n)$;

relative to a boresight of said star tracker, deriving off-boresight angles θ from said star-tracker signals for stars that are detected by said star tracker;

combining said off-boresight angles θ with variance coefficients α to thereby generate off-boresight variances $r_{ob}(t_n)$ that are functions of said off-boresight angles θ and correspond to color shift errors of said star tracker;

calculating a gain matrix $K(t_n)$ with a weighted measurement-noise covariance matrix $R(t_n)$ that includes said off-boresight variances $r_{ob}(t_n)$; and Kalman filtering said attitude measurement matrix $Y(t_n)$ with the aid of said gain matrix $K(t_n)$ to thereby generate said attitude estimate matrix $X^*(t_n^+)$.

2. The method of claim 1, wherein said Kalman filtering step includes the steps of:

with a state transition matrix $\Phi(t_n, t_{n-1})$, extrapolating a delayed version of an attitude estimate matrix $X^*(t_{n-1})$ that corresponds to a preceding time $t_{n-1}$ into a state prediction matrix $X^*(t_n)$ and a measurement prediction matrix $Y^*(t_n^-)$ for a time $t_n^-$ before said processing step;

differencing said attitude measurement matrix $Y(t_n)$ and said measurement prediction matrix $Y^*(t_n^-)$ to form a residue $Y(t_n)-Y^*(t_n^-)$; and summing said state prediction matrix $X^*(t_n^-)$ with a correction matrix $K(t_n)\{Y(t_n)-Y^*(t_n^-)\}$ that is the product of said gain matrix $K(t_n)$ and said residue $Y(t_n)-Y^*(t_n^-)$ to thereby generate said attitude estimate matrix $X^*(t_n^+)$.

3. The method of claim 2, wherein said extrapolating step includes the step of multiplying said state prediction matrix $X^*(t_n^-)$ by a measurement matrix $H(t_n)$ to realize said measurement prediction matrix $Y^*(t_n^-)$.

4. The method of claim 3, further including the step of facilitating said calculating step with an estimate covariance matrix $P(t_n)$, a process-noise covariance matrix $Q(t_n)$ and said measurement matrix $H(t_n)$.

5. The method of claim 2, further including the steps of:

forming an attitude-rate measurement matrix $Y_r(t_n)$ from attitude rate signals of at least one gyro; and realizing said extrapolating step with the aid of said attitude-rate measurement matrix $Y_r(t_n)$.

6. The method of claim 1, wherein said combining step includes the step of multiplying the square of said off-boresight angles θ with said variance coefficients α to thereby realize said off-boresight variances $r_{ob}(t_n)$.

7. The method of claim 1, further including the steps of:
identifying the spectral class of said stars; and
reducing the magnitude of said variance coefficients α to correspond to said spectral class and to thereby reduce the magnitude of said off-boresight variances $r_{ob}(t_n)$.

8. The method of claim 1, further including the steps of:
providing constant variances $r_c(t_n)$ that account for star tracker measurement variances that are constant with said off-boresight angles θ; and
including said constant variances $r_c(t_n)$ in said weighted measurement-noise covariance matrix $R(t_n)$.

9. The method of claim 1, further including the step of modifying said variance coefficients (x to include focal length shift errors of said star tracker.

10. The method of claim 1, wherein said variance coefficients α include variances $α_h$ and $α_v$ that correspond to respective orthogonal axes h and v of said star tracker.

11. The method of claim 1, wherein said at least one star tracker comprises three star trackers oriented along three mutually-orthogonal axes of said spacecraft.

12. An attitude determination system that generates an attitude estimate matrix $X^*(t_n^+)$ for times $t_n^+$ after respective attitude measurements at successive times $t_n$ for use in attitude control of a spacecraft, the system comprising:
at least one star tracker that is coupled to said spacecraft for providing star-tracker signals; and
a data processor programmed to perform the following steps:
 a) at successive times tn, processing said star-tracker signals to form an attitude measurement matrix $Y(t_n)$;
 b) relative to a boresight of said star tracker, deriving off-boresight angles θ from said star-tracker signals for stars that are detected by said star tracker;
 c) combining said off-boresight angles θ with variance coefficients α to thereby generate off-boresight variances $r_{ob}(t_n)$ that are functions of said off-boresight angles θ and correspond to color shift errors of said star tracker;
 d) calculating a gain matrix $K(t_n)$ with a weighted measurement-noise covariance matrix $R(t_n)$ that includes said off-boresight variances $r_{ob}(t_n)$; and
 e) Kalman filtering said attitude measurement matrix $Y(t_n)$ with the aid of said gain matrix $K(t_n)$ to thereby generate said attitude estimate matrix $X^*(t_n^+)$.

13. The system of claim 12, wherein said Kalman filtering step includes the steps of:
with a state transition matrix $Φ(t_n, t_{n-1})$, extrapolating a delayed version of an attitude estimate matrix $X^*(t_{n-1})$ that corresponds to a preceding time $t_{n-1}$ into a state prediction matrix $X^*(t_n^-)$ and a measurement prediction matrix $Y^*(t_n^-)$ for a time $t_n^-$ before said processing step;
differencing said attitude measurement matrix $Y(t_n)$ and said measurement prediction matrix $Y^*(t_n^-)$ to form a residue $Y(t_n)-Y^*(t_n^-)$; and
summing said state prediction matrix $X^*(t_n^-)$ with a correction matrix $K(t_n)\{Y(t_n)-Y^*(t_n^-)\}$ that is the product of said gain matrix $K(t_n)$ and said residue $Y(t_n)-Y^*(t_n^-)$ to thereby generate said attitude estimate matrix $X^*(t_n^+)$.

14. The system of claim 13, wherein said system further includes at least one gyro that is coupled to said spacecraft for providing attitude rate signals and said data processor is further programmed to perform the steps of:
forming an attitude-rate measurement matrix $Y_r(t_n)$ from said attitude rate signals; and
realizing said extrapolating step with the aid of said attitude-rate measurement matrix $Y_r(t_n)$.

15. The system of claim 12, wherein said combining step includes the step of multiplying the square of said off-boresight angles θ with said variance coefficients α to thereby realize said off-boresight variances $r_{ob}(t_n)$.

16. The system of claim 12, said data processor is further programmed to perform the steps of:
identifying the spectral class of said stars; and
reducing the magnitude of said variance coefficients α to correspond to said spectral class and to thereby reduce the magnitude of said off-boresight variances $r_{ob}(t_n)$.

17. The system of claim 12, said data processor is further programmed to perform the steps of:
providing constant variances $r_c(t_n)$ that account for star tracker measurement variances that are constant with said off-boresight angles θ; and
including said constant variances $r_c(t_n)$ in said weighted measurement-noise covariance matrix $R(t_n)$.

18. The system of claim 12, said data processor is further programmed to perform the step of modifying said variance coefficients a to include focal length shift errors of said star tracker.

19. The system of claim 12, wherein said variance coefficients α include variance coefficients $α_h$ and $α_v$ that correspond to respective orthogonal axes h and v of said star tracker.

20. The system of claim 12, wherein said at least one star tracker comprises three star trackers oriented along three mutually-orthogonal axes of said spacecraft.

21. An attitude-controlled spacecraft system, comprising:
a spacecraft;
at least one star tracker that is coupled to said spacecraft for providing star-tracker signals;
a data processor in said spacecraft that is programmed to perform the following steps:
 a) at successive times $t_n$, processing said star-tracker signals to form an attitude measurement matrix $Y(t_n)$;
 b) relative to a boresight of said star tracker, deriving off-boresight angles θ from said star-tracker signals for stars that are detected by said star tracker;
 c) combining said off-boresight angles θ with variance coefficients α to thereby generate off-boresight variances $r_{ob}(t_n)$ that are functions of said off-boresight angles θ and correspond to color shift errors of said star tracker;
 d) calculating a gain matrix $K(t_n)$ with a weighted measurement-noise covariance matrix $R(t_n)$ that includes said off-boresight variances $r_{ob}(t_n)$; and
 e) Kalman filtering said attitude measurement matrix $Y(t_n)$ with the aid of said gain matrix $K(t_n)$ to thereby generate an attitude estimate matrix $X^*(t_n^+)$ at times $t_n^+$ after respective times $t_n$
an attitude controller in said spacecraft that generates torque generation signals in response to an attitude difference between a commanded attitude and said attitude estimate matrix $X^*(t_n^+)$; and
a torque generation system that is coupled to generate torques in said spacecraft is responsive to said torque generation signals to thereby reduce said attitude difference.

22. The spacecraft system of claim 21, wherein said Kalman filtering step includes the steps of:

with a state transition matrix $\Phi(t_n, t_{n-1})$, extrapolating a delayed version of an attitude estimate matrix $X^*(t_{n-1})$ that corresponds to a preceding time $t_{n-1}$ into a state prediction matrix $X^*(t_n^-)$ and a measurement prediction matrix $Y^*(t_n^-)$ for a time $t_n^-$ before said processing step;

differencing said attitude measurement matrix $Y(t_n)$ and said measurement prediction matrix $Y^*(t_n^-)$ to form a residue $Y(t_n)-Y^*(t_{n-})$; and summing said state prediction matrix $X^*(t_n^-)$ with a correction matrix $K(t_n)\{Y(t_n)-Y^*(t_n^-)\}$ that is the product of said gain matrix $K(t_n)$ and said residue $Y(t_n)-Y^*(t_{n-})$ to thereby generate said attitude estimate matrix $X^*(t_n^+)$.

23. The spacecraft system of claim 22, wherein said spacecraft system further includes at least one gyro that is coupled to said spacecraft for providing attitude rate signals and said data processor is further programmed to perform the steps of:

forming an attitude-rate measurement matrix $Y_r(t_n)$ from said attitude rate signals; and realizing said extrapolating step with the aid of said attitude-rate measurement matrix $Y_r(t_n)$.

24. The spacecraft system of claim 21, wherein said combining step includes the step of multiplying the square of said off-boresight angles $\theta$ with said variance coefficients $\alpha$ to thereby realize said off-boresight variances $r_{ob}(t_n)$.

25. The spacecraft system of claim 21, said data processor is further programmed to perform the steps of:

identifying the spectral class of said stars; and reducing the magnitude of said variance coefficients $\alpha$ to correspond to said spectral class and to thereby reduce the magnitude of said off-boresight variances $r_{ob}(t_n)$.

26. The spacecraft system of claim 21, said data processor is further programmed to perform the steps of:

providing constant variances $r_c(t_n)$ that account for star tracker measurement variances that are constant with said off-boresight angles $\theta$; and including said constant variances $r_c(t_n)$ in said weighted measurement-noise covariance matrix $R(t_n)$.

27. The spacecraft system of claim 21, said data processor is further programmed to perform the step of modifying said variance coefficients $\alpha$ to include focal length shift errors of said star tracker.

28. The spacecraft system of claim 21, wherein said variance coefficients $\alpha$ include variances $\alpha_h$ and $\alpha_v$ that correspond to respective orthogonal axes h and v of said star tracker.

29. The spacecraft system of claim 21, wherein said at least one star tracker comprises three star trackers oriented along three mutually-orthogonal axes of said spacecraft.

* * * * *

UNITED STATES PATENT AND TRADEMARK OFFICE
CERTIFICATE OF CORRECTION

PATENT NO. : 6,356,815 B1  
DATED : March 12, 2002  
INVENTOR(S) : Yeong-Wei A. Wu, Rongsheng Li and John Y. Liu It is certified that error appears in the above-identified patent and that said Letters Patent is hereby corrected as shown below:

<u>Column 1,</u>  
Line 6, before "BACKGROUND OF THE INVENTION" insert:  
-- The invention described herein was made in the performance of work under NASA Contract Number NAS5-98069 and is subject to the provisions of Section 305 of the National Aeronautics and Space Act of 1958 (72 Stat. 435; 42 U.S.C. 2457). --

Signed and Sealed this

Eighteenth Day of November, 2003

JAMES E. ROGAN  
*Director of the United States Patent and Trademark Office*